April 13, 1954   B. STADE   2,675,253
VENTILATED CONDUIT COUPLING
Filed Oct. 18, 1952   2 Sheets-Sheet 1
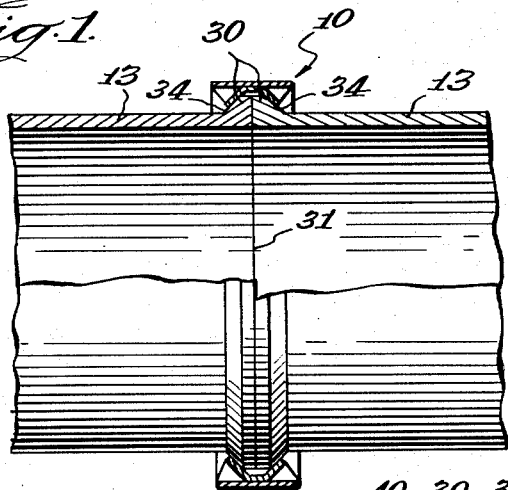
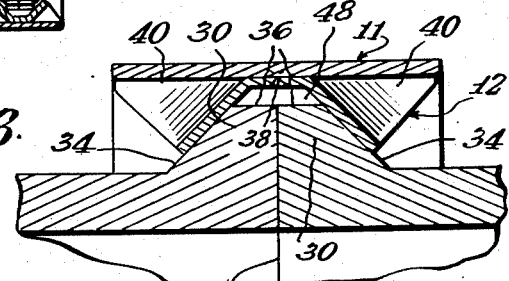
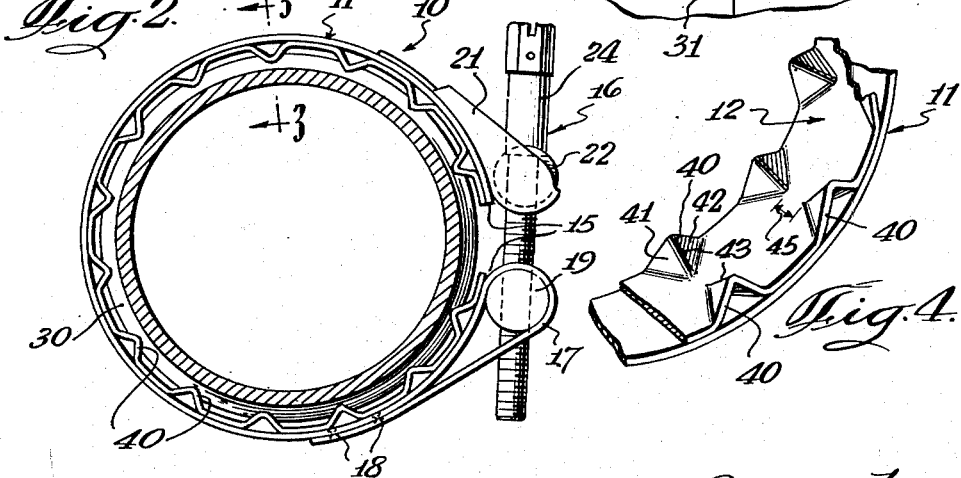
Inventor
Bertil Stade
By J. Irving Silverman
Attorney

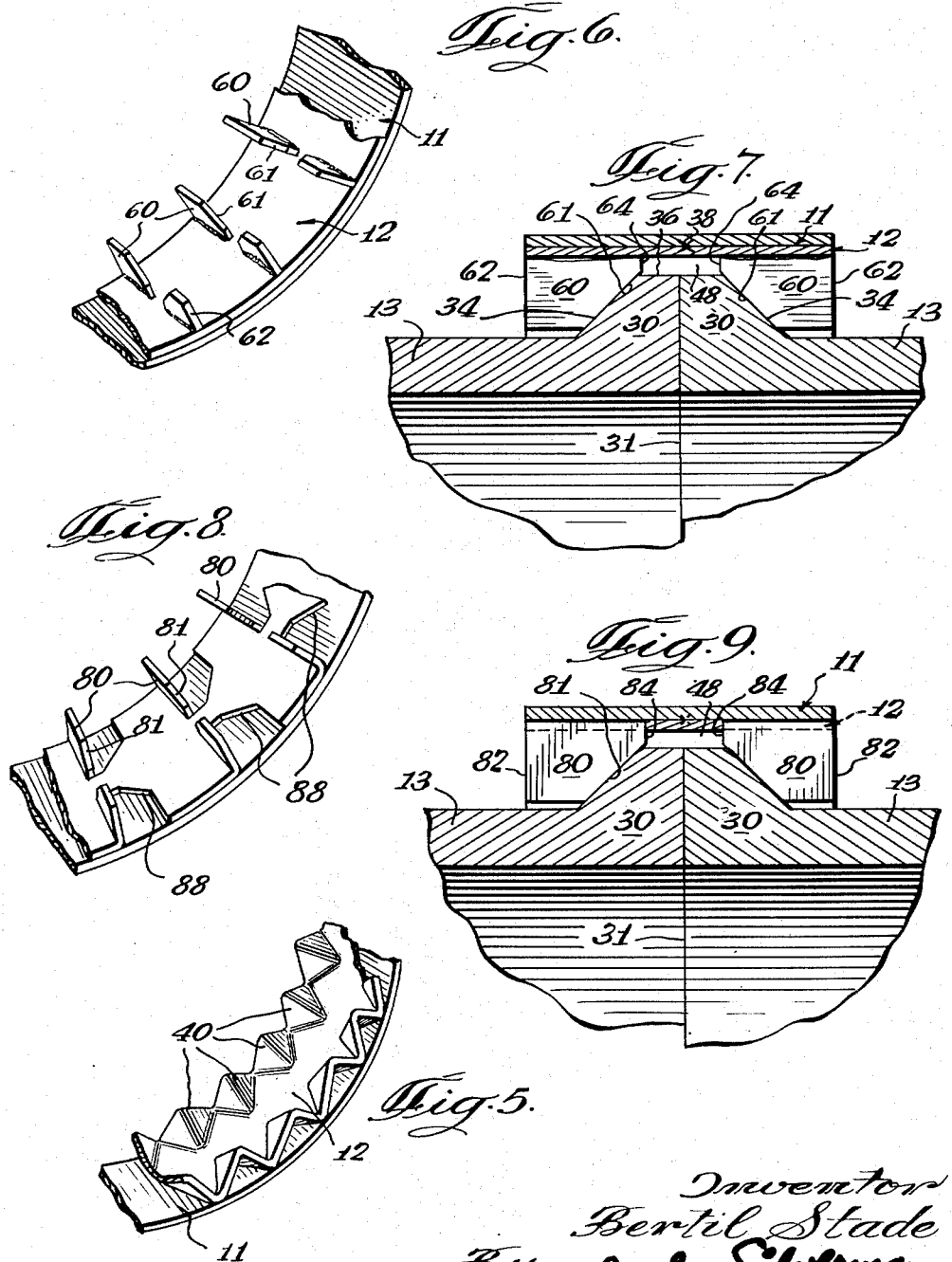

Patented Apr. 13, 1954

2,675,253

UNITED STATES PATENT OFFICE 2,675,253

VENTILATED CONDUIT COUPLING

Bertil Stade, Elmwood Park, Ill., assignor to Wittek Manufacturing Co., Chicago, Ill., a corporation of Illinois Application October 18, 1952, Serial No. 315,444

7 Claims. (Cl. 285—129)

This invention relates generally to conduit couplings and more particularly is concerned with a clamping device which is intended to join together the abutting ends of conduits subjected to high pressures and heat.

In certain fluid conduits, especially those of internal combustion engines and aircraft fluid conducting systems, it is desirable to have a quickly removable, light weight, small volume, efficient coupling and hence the trend has been for such couplings to be formed much like one of the familiar hose-clamp constructions. The hose clamp referred to generally consists of a loop or band of metal having an opening in the loop so that same may be spread and clasped about the hose or conduit, and having some kind of fastening connection between the ends which can be drawn up to tighten the clamp in hose-encircling condition about the conduit.

In the case of high pressure couplings, it is required that some means be provided to draw the abutting ends of the juxtaposed conduits together and force the same one against the other when the coupling is secured in order to render the resulting joint tight. In the case that the fluid being conducted through the conduits is of very high temperature such as occurs in exhaust manifolds and stacks, some means must be provided to dissipate the engendered heat, or at least to prevent its being concentrated at the joint.

To this end, others have attempted to provide such couplings, but not without disadvantages. In the first place, by virtue of prior constructions, insufficient air was permitted to circulate about the parts of the coupling whereby same enabled the juncture to become hot. In the second place, prior devices were constructed with flexible teeth or fingers which were required to flex in order to draw the conduit halves together. Such devices were apt to lose their efficiency after re-use a few times, and were expensive to fabricate and occupied a considerable volume of space about the coupling. Other disadvantages of prior devices arose in that they have been made in such a manner as to employ a great deal of metal, and in the case of expensive metals such as stainless steel, this increased not only the cost of materials, but the cost of dies to manufacture the same, as well as labor.

The principal object of the invention is to provide a conduit coupling whose purpose it is to retain the abutting ends of a pair of conduits, or conduit halves as they may be termed, tightly pressed against one another to seal the same, the said coupling having a novel and improved construction whereby same overcomes the disadvantages referred to above.

Still another object of the invention is to provide a conduit coupling in which great strength is obtained by providing rigid circumferentially spaced triangularly shaped projections on a clamp liner, the total metal width of which is substantially the same as the clamping band.

Further objects of the invention lie in the provision of novel manners of forming the projections of the liner and in providing novel formations for said projections.

In accordance with the invention there is provided a conduit coupling device of the character described in which, by virtue of the manner of bracing or forcing the conduit halves one against the other, the points of engagement of the projections may be widely circumferentially spaced so that there is a great deal of air space between them for ventilation purposes, the achievement of this being also an object of the invention. The conduit coupling of the invention is also quite compact since it is made out of less metal than others heretofore known, and does not extend radially outward from the joint by any great amount. The projections which are engaged against the conduit flanges, in accordance with the invention, have principally an edge contact parallel to the plane of the projections thereby enabling great pressures to be exerted by the clamping band and using very thin gauge metal. Prior devices which utilized teeth or fingers have had the pressure exerted against the fingers in such a manner as to tend to bend the fingers outward with the bending axis coinciding with a juncture between two planes of metal thereby limiting the pressure which could be applied to thin gauge metal. The conduit coupling device of the invention is provided with projections generally joining the liner from which the same are formed along a juncture which is substantially parallel with the force tending to bring the conduit halves together and hence also tending to end the projections outward. Obviously this provides great resistance to bending and fracture and enables the liner and the projections to be formed of very thin gauge metal if desired.

In one form of the invention herein, the projections are pyramidal in formation, whereby extremely great strength is engendered through the use of thin gauge metal, while achieving rigidity and strength. In this form of the invention, the liner which carries the projections is a continuous metal strip totally imperforate and having no weakening cuts or punch-outs of any kind therein, whereby the same is easily and cheaply formed and occupies very little volume.

As the description of the invention proceeds hereinafter, it will become apparent to the skilled artisan that there has been devised a conduit coupling for the purposes described which has advantages and salutary objects in addition to those suggested hereinabove. It will also become apparent that many variations and changes are possible without departing from the scope or varying from the spirit of the invention, and with this in mind, the specific description of preferred embodiments which follows, and which is required by the statutes is only intended by way of illustration and clarification and not by way of limitation.

In the drawings in which like characters are used to designate the same or similar parts throughout the several figures of the drawings, and in which the preferred embodiments are illustrated in some detail:

Fig. 1 is a side elevational view, partly in section, showing a conduit coupling of the invention engaged upon and forcibly retaining the flanged abutting ends of conduit halves one against the other in a substantially sealed joint.

Fig. 2 is a sectional view taken through the joint along a plane perpendicular to the axis of the conduit.

Fig. 3 is a sectional view taken generally along the line 3—3 of Fig. 2 and in the direction indicated, same being on an enlarged scale.

Fig. 4 is a fragmentary perspective view of the inside of the conduit coupling illustrated in Figs. 1 to 3.

Fig. 5 is a view similar to that of Fig. 4 but of a modified form of the invention.

Fig. 6 is a view similar to that of Fig. 4 but of another modified form of the invention.

Fig. 7 is a view similar to that of Fig. 3 but of the form of the invention illustrated in perspective in Fig. 6.

Figs. 8 and 9 are similar to those of Figs. 6 and 7 respectively, but illustrating still another modified form of the invention.

The invention resides principally in the liner of the device, the remainder being of any suitable construction, such as for example the construction of that hose clamp shown and described in U. S. Letters Patent 2,341,828 issued February 15, 1944 to C. C. Tetzlaff. Referring to the particular construction illustrated herein, the reference character 10 is used to designate generally the entire device, while 11 represents the outer hose clamp band and 12 represents the liner.

The outer band or strap 11 is a tension member intended to be drawn about the conduit, the two halves of which are designated 13. Consequently the band 11 is split forming thereby the spaced apart ends 15 bridged by a fastening device designated generally 16. The construction illustrated has one of these free ends looped upon itself as shown at 17 and welded at 18 to form a socket or loop within which may be disposed a cylindrical nut 19. The opposite end of the band 11 has a prefabricated socket 21 welded thereto to house a trunnion 22 of cylindrical formation loosely mounted on the shank of the bolt 24. The upper portion of the socket is open and the juxtaposed faces of the socket 21 and the loop 17 are perforated or slotted to enable the bolt 24 to be accommodated. Obviously taking up on the bolt draws the ends 15 together.

Considering for the moment the type of conduit halves 13 which are intended to be sealed together by the device 10, note that each has an annular flanged end 30 provided on its abutted face with at least one surface in a plane perpendicular to the conduit axis. Thus, the abutting halves 13 will form a tight juncture shown at 31. No gaskets are shown, although obviously under certain circumstances they may be used. The outer faces of the flanges are slanted as at 34 in a direction such that when halves are conjoined, these faces tended to converge. The outer circumference of the flanges join to provide an annular cylindrical surface 36 such that the cross-sectional configuration of the flanges may be considered trapezoidal. Actually, since the only important surface of each flange is the slanted portion 34, presuming that a tight juncture is made, the flanges can be said to have triangular cross-sectional configuration, or the flanges could be described as each having a frusto-conical surface.

It is desired that when the band 11 is tightened, axial forces will be exerted against the flanges 30 to force one against the other. Such forces must be opposing one another from the outside of the flanges and directed against the surfaces 34.

Referring now to Fig. 4, the liner 12 is secured to the inner surface of the band by spot welding for example, as shown at 38. Since the center of the liner 12 is arranged face to face with the band 11, there is sufficient width between the inner ends of the projections (to be described) to accommodate a welding wheel of an automatic welding machine, enabling the particular operation of joining liner to band to be done speedily and with economy. Along opposed edges of the liner 12 there are formed upset projections 40, extending radially inward of the device 10 and having generally pyramidal formation. The projections 40 each comprise two triangular shaped walls 41 and 42 joined along a crease or bend 43 slanting radially divergently one from the other with the remaining side of the pyramid open. The angle of the bends 43 is such that when engaged over a pair of conduit halves 13, the bends will lie upon the frusto-conical surfaces 34 of the respective flanges 30. Furthermore, the distance between the inner ends of the projections 40, i. e. the space between the points where opposite bends 43 meet the inner surface of the liner 12 is preferably less than the axially measured length of the surface 36. This space is designated 45 in Fig. 4. The purpose of this is that as the diameter of the device 10 is decreased in tightening the same, the force engendered will always be applied to the frusto-conical surfaces 34, and never to the surface 36, giving rise to the space 48 in Fig. 3.

The effective center of the pyramidal shaped projections 40, and the median of maximum strength thereof is defined by a plane perpendicular to the flat portion of the liner 12 and band 11, and passing through the bend 43 and the axis of the device 10. The triangular shaped walls 41 and 42 of each projection provide bracing lateral support for the projection and divide between them the deforming or crushing pressure to which the projection is subjected when the device is tightened. Thus, great strength is achieved by relatively thin gauge metal projections.

Note that the projections 40 are upset from the strip of metal forming the liner, and hence a continuous strip process may be used to make such liners, with simple roller dies if desired. It is also not essential that the projections on opposite edges of the liner 12 be positioned directly opposite one another, although greater pressure can be applied in such constructions. It is pointed out that the total width of the liner 12 is substantially that of the outer band 11. This enables the device 10 to be very narrow and have relatively small total diameter when assembled to the conduit. Likewise, there is a great saving in material, while providing a saving in weight which is important in aircraft. In Fig. 4, it will be apparent that the projections are spaced apart circumferentially by a substantial amount, and it has been found that most cases permit of such construction. The spaces between projections are thus totally unobstructed, it being obvious that there is more unobstructed than obstructed spaced about the joint. This provides highly efficient ventilation and hence cooling of the joint.

In cases where it is desirous to apply greater force to the juncture and to engage the same at more points about the circumference thereof, the relative circumferential spacing of the projections 40 may be increased as shown in the modified form in Fig. 5. The particular arrangement of Fig. 5 shows the maximum number of projections wherein they are immediately alongside one another.

Figs. 6 to 9 illustrate two modified forms of the invention, but both are characterized by the provision of rigid radial projections on the inner surface of the liner arranged perpendicular to the liner. Instead of being formed as pyramidal configurations, the projections are unitary lugs or ears integral with the liner the respective planes of which are coincidental with the plane of maximum strength thereof. These are the same as the planes of maximum strength of the pyramidal shaped projections 40.

Referring now to Figs. 6 and 7, in this modification the liner 12 is provided with projections 60 each of which has been pre-fabricated, as for example by punching same from sheet metal. Each projection 60 is of generally rectangular formation with a corner removed. Thus, there is formed a slanted edge 61 which is the equivalent of the bend 43 in that its angle is identical and its purpose is to engage the frusto-conical surface 34 in the same manner. The outer edges 62 of the projections are preferably flush with the edges of the liner 12 and band 11. The inner ends 64 of the projections are wide enough apart to leave a space permitting welding 38 in the manner described above. These ends extend perpendicularly to the liner instead of being a continuation of the slanted edges 61 to leave the space 48. The base of each lug or ear is welded to the liner 12 as shown at 66.

Like the projections 40, the projections 60 force the halves of the conduit together when the band 11 is pulled tight. This action is a considerably amplified application of force since it involves a wedging action, with the slanted edges 61 or the bends 43 sliding along the slanted surfaces 34.

The form of the invention shown in Figs. 8 and 9 is identical to that of Figs. 6 and 7 with one exception. The projections 80 are identical in shape and formation to projections 60 but instead of being welded to the liner, they are partially punched out of the liner and bent at right angles thereto, so that the liner 12 is provided with the punched out recesses 88 as shown in Fig. 8. The projections 80 have the slanted edge 81 corresponding to the slanted edges 61; the outer edges 82 flush with the edges of the liner 12 and band 11 just as are the edges 62; the inner edges 84 forming the space 48. Although only the projections 80 are formed and bent from the same member comprising the liner 12 it can be stated that both the projections 60 and 80 are integral with the liner 12 since it is conceivable that the liner and projections of Figs. 6 and 7 could be formed by methods other than welding the parts together.

It is believed that the invention has been fully explained and illustrated with sufficient clarity to enable one skilled in the art to understand, practice, and construct the same, and it is again emphasized that the details are capable of variation without departing from the spirit or scope of the invention.

What is claimed by Letters Patent of the United States is:

1. A conduit coupling of the character described for forcing the halves of a conduit into abutting engagement and each half having a frusto-conical surface converging outwardly towards the other surface, the coupling including a band adapted to be drawn constrictingly about the juncture, a band liner secured to the band on the interior thereof and substantially coextensively therewith, rigid radial projections formed integral with the liner and spaced about the inner circumference thereof adjacent opposite edges thereof, each projection comprising a pair of triangular walls joined along a bend, the bends of opposite projections slanting divergently one from the other outwardly toward the planes of the adjacent edges, said bends arranged to engage against said frusto-conical surfaces when the band is constricted.

2. A conduit coupling of the character described for forcing the halves of a conduit in abutting engagement and each half having a frusto-conical surface converging outwardly towards the other surface, the coupling including a band adapted to be drawn constrictingly about the juncture, means for drawing the band in said constricting action, a continuous, imperforate metal liner of relatively thin gauge secured on the interior of the band substantially coextensively therewith and substantially the same width as said band, two spaced rows of pyramidal shaped rigid radial projections integrally formed with the liner and spaced about the inner circumference thereof adjacent opposite edges of the liner, each projection comprising a pair of triangular walls joined along a crease with the creases of the opposed projections slanting divergently one from the other and having outwardly facing triangular openings along the edge of the liner, said creases arranged to engage the frusto-conical surfaces on both sides of the juncture and slide radially thereon as the band is drawn up.

3. In a ventilated conduit coupling of the character described which is adapted to be engaged upon a pair of conduits each having a flanged end with a frusto-conical exterior surface, said surfaces converging outwardly and the ends adapted to abut against one another in close engagement, and the coupling having a split outer tension band and fastening means connecting the free ends for drawing the same together in constricting action about the joined conduit ends, a liner secured to the interior of the tension band and substantially coextensive therewith, circumferentially spaced rigid radial projections formed integral with the liner about the inner circumference thereof adjacent opposite edges thereof, said projections each having a portion extending inwardly from the liner and angularly outward toward the plane of the adjacent liner edge for engaging a conical surface, the liner being in substantially continuous circumferental face to face engagement with the tension band at least along the center of the liner, and the inner junctures of the projections with the liner being axially spaced apart about the circumference of the liner, leaving a free circumferential space along the center of the liner on the interior surface thereof.

4. A structure as described in claim 3 in which said portion comprises an edge of said projection.

5. In a ventilated conduit coupling of the character described which is adapted to be engaged upon a pair of conduits each having a flanged end with a frusto-conical exterior surface, said surfaces converging outwardly and the ends adapted to abut against one another in close engagement, and the coupling having a split outer tension band and fastening means connecting the free ends for drawing the same together in constricting action about the joined conduit ends, a liner secured to the interior of the tension band and substantially coextensive therewith, circumferentially spaced rigid radial projections formed integral with the liner about the inner circumference thereof adjacent opposite edges thereof, said projections each having a single sloped edge extending inwardly from the liner and angularly outward toward the plane of the adjacent edge to which same is secured, said sloped edge being in a radial plane engaging a frusto-conical surface and adapted to slide on a line contact with said surface as the tension band is constricted and the conduit ends are forced together, each projection being secured to said liner with its plane of maximum strength passing through the conduit axis and said sloped edge.

6. A structure as described in claim 5 in which said projections are trapezoidal formations.

7. A structure as described in claim 5 in which said liner is imperforate and said projections are formed as corrugations along the liner circumferential edges, each having opposite walls diverging away from said sloped edge to the liner to laterally brace the same.

References Cited in the file of this patent

UNITED STATES PATENTS

| Number | Name | Date |
|---|---|---|
| 711,946 | Day | Oct. 28, 1902 |
| 2,214,381 | Rastetter | Sept. 10, 1940 |
| 2,424,436 | Crater | July 22, 1947 |

FOREIGN PATENTS

| Number | Country | Date |
|---|---|---|
| 126,655 | Great Britain | May 22, 1919 |